US010909856B2

(12) United States Patent
Regueiro et al.

(10) Patent No.: US 10,909,856 B2
(45) Date of Patent: Feb. 2, 2021

(54) METHOD OF SELECTING, VIA A TERMINAL, A COMMUNICATION MODE FOR EXCHANGING DATA WITH BASE STATIONS

(71) Applicant: SIGFOX, Labege (FR)

(72) Inventors: Jon Regueiro, Toulouse (FR); Christophe Fourtet, Pompignan (FR)

(73) Assignee: SIGFOX, Labege (FR)

( * ) Notice: Subject to any disclaimer, the term of this patent is extended or adjusted under 35 U.S.C. 154(b) by 118 days.

(21) Appl. No.: 16/060,544

(22) PCT Filed: Dec. 6, 2016

(86) PCT No.: PCT/FR2016/053218
§ 371 (c)(1),
(2) Date: Jun. 8, 2018

(87) PCT Pub. No.: WO2017/098129
PCT Pub. Date: Jun. 15, 2017

(65) Prior Publication Data
US 2018/0366006 A1 Dec. 20, 2018

(30) Foreign Application Priority Data
Dec. 8, 2015 (FR) ...................................... 15 61990

(51) Int. Cl.
*G08G 5/00* (2006.01)
*H04W 4/029* (2018.01)
(Continued)

(52) U.S. Cl.
CPC .......... *G08G 5/0013* (2013.01); *G08G 5/0026* (2013.01); *G08G 5/0078* (2013.01);
(Continued)

(58) Field of Classification Search
CPC .......... G01S 13/74; G01S 19/42; G01S 13/79; G01S 13/933; G01S 19/03; G01S 19/13;
(Continued)

(56) References Cited

U.S. PATENT DOCUMENTS 3,659,085 A * 4/1972 Potter ...................... G01S 5/02
701/518
3,996,590 A * 12/1976 Hammack ............... G01S 1/302
342/465
(Continued)

FOREIGN PATENT DOCUMENTS

EP 1 379 013 A1 1/2004
EP 1 389 026 A1 2/2004

*Primary Examiner* — Behrang Badii
(74) *Attorney, Agent, or Firm* — Im IP Law; Chai Im; C. Andrew Im

(57) ABSTRACT

A method of selecting, by a terminal of a wireless communication system, a mode of communication to be used to exchange data with the base stations of the wireless communication system. The mode of communication being selected from among at least two different modes of communication associated with different respective geographical zones. The terminal receiving a surveillance message transmitted by an aircraft, the surveillance message includes information on the position of the aircraft. The terminal estimating the geographical zone in which the terminal is situated, as a function of the aircraft position information extracted from the received surveillance message. The mode communication is selected as a function of the estimated geographical zone of the terminal.

11 Claims, 1 Drawing Sheet

(51) Int. Cl.
*H04B 7/185* (2006.01)
*H04W 4/02* (2018.01)
*H04L 29/08* (2006.01)
*H04W 88/06* (2009.01)

(52) U.S. Cl.
CPC ....... *G08G 5/0082* (2013.01); *H04B 7/18506* (2013.01); *H04L 67/04* (2013.01); *H04L 67/12* (2013.01); *H04L 67/18* (2013.01); *H04W 4/025* (2013.01); *H04W 4/029* (2018.02); *H04W 88/06* (2013.01)

(58) Field of Classification Search
CPC ........ G01S 13/781; G01S 19/14; G01S 1/302; G01S 5/06; G01S 5/00; G01S 13/91; G01S 13/878; G01S 7/003; G01S 5/0009; G01S 3/46; G01S 5/02; G01S 5/14; G01S 11/02; G01S 11/10; G01S 13/58; G01S 13/66; G01S 13/87; G01S 13/46; G01S 5/0226; G01S 5/0252; G01S 19/17; G08G 5/0008; G08G 5/0021; G08G 5/0078; G08G 5/045; G08G 5/0052; G08G 5/0034; G08G 5/0086; G08G 5/0026; G08G 5/0082; G08G 5/00; G06K 19/06028; G06K 19/07703; G06K 19/07749; G06K 19/025; G07C 5/008; B64C 11/44; B64C 11/001; H04B 1/0053; H04B 1/401; H04B 1/48; H04B 7/18506; H04B 7/18584; H04B 1/18508; H04W 52/0254; H04W 64/00; H04W 4/029; H04W 40/20; H04W 4/025; H04W 88/06; H04W 4/027; H04W 4/44; H04W 40/16; H04W 28/02; H04W 4/90; H04W 4/024; H04W 72/10; H04W 4/00; H04W 28/0268; H04W 4/60; H04W 4/80; H04W 4/40; H04W 72/1226; H04W 28/24; B64D 27/24; B64D 41/007; G01C 21/20; G05D 27/02; G08B 27/005; G08B 5/0013; H04L 67/12; H04L 67/04; H04L 67/18; H04L 45/124; H04L 45/125; H04L 67/2847; F25D 29/003; G09B 9/006; G06Q 10/08

See application file for complete search history.

(56) References Cited

U.S. PATENT DOCUMENTS

| | | | |
|---|---|---|---|
| 5,450,329 A * | 9/1995 | Tanner | G01S 19/14 701/467 |
| 2004/0132462 A1 | 7/2004 | Bonnard et al. | |
| 2009/0248287 A1 | 10/2009 | Limbaugh et al. | |
| 2012/0143405 A1 * | 6/2012 | Cabos | G07C 5/008 701/3 |
| 2012/0146833 A1 * | 6/2012 | Pawlitzki | G01S 13/878 342/37 |
| 2016/0018508 A1 * | 1/2016 | Chen | G01S 5/0252 455/456.1 |
| 2016/0349361 A1 * | 12/2016 | Schulte | G01S 13/74 |
| 2017/0006573 A1 * | 1/2017 | Kelly | G06K 19/07749 |
| 2017/0212210 A1 * | 7/2017 | Chen | G01S 5/06 |

* cited by examiner

METHOD OF SELECTING, VIA A TERMINAL, A COMMUNICATION MODE FOR EXCHANGING DATA WITH BASE STATIONS

RELATED APPLICATIONS

This application is a § 371 application from PCT/FR2016/053218 filed Dec. 6, 2016, which claims priority from French Patent Application No. 15 61990 filed Dec. 8, 2015, each of which is incorporated herein by reference in its entirety.

TECHNICAL FIELD

This invention pertains to the field of wireless communication systems. More specifically, this invention relates to the selection, by a terminal, of a communication mode to exchange data with base stations of a wireless communication system.

BACKGROUND OF THE INVENTION

In some wireless communication systems, terminals must handle various different communication modes for the purpose of exchanging data with base stations. These communication modes are, for example, to be used in different respective geographical zones, in order to comply with the regulatory requirements applicable in each of those geographical zones.

For example, the frequency band used to transmit signals, on an uplink from the terminal to the base stations and/or on the downlink from said base stations to the terminal, the maximum signal transmission power, etc. can vary from one geographical zone to the other, due to local regulatory requirements.

In current wireless communication systems, such as GSM, UMTS, LTE, etc., the base stations transmit a recurring broadcast signal, also known as a beacon, used by terminals to select the communication mode.

For example, the frequency band in which the broadcast signal is transmitted can vary from one geographical zone to the other. In this case, the terminal listens in succession to the various available frequency bands, looking for a broadcast signal. When a broadcast signal is detected, the terminal can deduct, based on the frequency band of said broadcast signal, which communication mode is to be used in the geographical zone in which it is located.

In applications such as "Internet of Things" (IoT), each everyday object can become a communicating object, and is for that purpose equipped with a terminal of a wireless communication system. However, it is clear that, to the extent possible, the cost of the terminal must not have a significant impact on the cost of the object it integrates, so that many everyday objects can become communicating objects. The power consumption of said terminals should be reduced to a minimum, so as not to impact the autonomy of battery-powered objects.

Furthermore, to reduce the implementation costs of a wireless communication system for the IoT, it is also advantageous to use a license-free frequency band. For example, the ISM band (Industrial, Scientific and Medical band) includes frequency bands that are free of license in that they can be used without prior administrative authorization, provided that certain regulatory requirements are complied with.

The transmission of broadcast signals on these frequency bands can become complex because of the regulatory requirements that are imposed. In particular, limitations in terms of the time occupancy rate make it impossible to transmit a continuous broadcast signal. Furthermore, in order to increase the transmission power of the broadcast signal, for the purpose of extending the range of the transmitting base station, the time occupancy rate of the frequency band must be reduced. As a consequence, the period of silence between two successive broadcast signals can be long, which means that the listening time before a broadcast signal is received is also long.

In this context, successively listening to different frequency bands to detect a broadcast signal can be time consuming, and will increase the power consumption to levels that are too high for a battery-powered object.

OBJECT AND SUMMARY OF THE INVENTION

The purpose of this invention is to remedy all or part of the limitations of the solutions according to the state of the art, in particular those described above, by proposing a solution whereby a terminal can select a communication mode without having to listen for a long time to one or several frequency bands.

Therefore, in a first embodiment, the invention relates to a method of selecting, by a terminal of a wireless communication system, a communication mode to be used to exchange data with base stations of said wireless communication system, wherein said communication mode is selected from among at least two different communication modes associated with different respective geographical zones. Said method includes the following steps:
  reception, by the terminal, of a surveillance message transmitted by an aircraft, said surveillance message containing information on the position of said aircraft,
  estimation, by the terminal, of the geographical zone where said terminal is located, as a function of the information on the position of the aircraft extracted from said received surveillance message,
  selection of the communication mode as a function of the estimated geographical zone of said terminal.

Therefore, the selection method includes the estimation, by the terminal, of the geographical zone in which it is located, based on which the terminal can deduce the communication mode that should be used.

Advantageously, to estimate the geographical zone in which it is located, said terminal uses surveillance messages transmitted by aircrafts, as each surveillance message includes information on the position of the aircraft that has transmitted the surveillance message.

These provisions are particularly advantageous in that these surveillance messages, such as ADS-B messages ("Automatic Dependent Surveillance-Broadcast") can generally be decoded with receiving devices that are simple and cheap to manufacture.

Furthermore, it is possible to listen to a single frequency band to receive these surveillance messages, since the same frequency band is generally used throughout the world, for example the frequency band around 1090 MHz, in the case of the 1090ES data link ("Mode S Extended Squitter") of the ADS-B.

Finally, the frequency band listening time required to receive a surveillance message from an aircraft can be very short. For example, in the case of 1090ES messages, each aircraft transmits a surveillance message, which includes information on the position of said aircraft, more or less periodically, every 0.4 to 0.6 seconds, where the duration of each surveillance message is of approximately 120 microseconds. In practice, a terminal will often be located within the range of several aircrafts, and will therefore receive several 1090ES messages from these aircrafts in less than a second. It is therefore clear that the listening time necessary to receive at least one 1090ES message can be very short, in the range of ten milliseconds or less.

Consequently, the reception of aircraft surveillance messages, by a terminal, can be achieved by a receiving device that is simple and cheap to manufacture, can be limited to listening to a single frequency band, and can last for an extremely short period.

The range of aircraft surveillance messages corresponds to the distance at which a surveillance message transmitted by said aircraft can be decoded by an adapted receiving device. For example, in the case of 1090ES messages, the range is generally of approximately 300 kilometers. Therefore, the position of the terminal receiving a 1090ES message from an aircraft is the position of the aircraft within a margin of 300 km. The estimation of the terminal's position, as a function of a single surveillance message, is therefore not very accurate. However, this accuracy is, in practice, generally sufficient to differentiate various geographical zones, as these are usually at a great distance from one another (for example the United States and Europe).

In specific implementations, the selection method can also include one or several of the following features, taken independently or in any of their technically-possible combinations.

In specific implementation modes, the communication modes differ by at least one of the following parameters:
frequency band of the signals transmitted by the terminal,
frequency band of the signals received by the terminal,
power of the signals transmitted by the terminal,
data throughput of the signals transmitted by the terminal,
method of access to a channel on which data is exchanged between the terminal and base stations.

In specific implementation modes, the surveillance message received from the aircraft is an ADS-B message.

In specific implementation modes, the surveillance message received from the aircraft is a 1090ES message.

In specific implementation modes, when the terminal receives surveillance messages transmitted by several aircrafts, the step of estimating the terminal's geographical zone includes selecting a surveillance message among said received surveillance messages, and the geographical zone of said terminal is estimated as a function of the information on the aircraft's position extracted from said selected surveillance message.

In specific implementation modes, when the terminal receives surveillance messages transmitted by several aircrafts, the step of estimating the terminal's geographical zone includes estimating the position of said terminal as a function of the information on the positions of several aircrafts extracted from several received surveillance messages, and the geographical zone of said terminal is estimated as a function of the estimated position of said terminal.

In specific implementation modes, the geographical zone in which the terminal is located is estimated by comparing an estimated position of said terminal with reference positions associated respectively with the different geographical zones.

In a second embodiment, the invention relates to a terminal of a wireless communication system that includes a communication module adapted to exchange data with base stations of said wireless communication system according to at least two different communication modes associated with different respective geographical zones. Furthermore, the terminal includes:
a surveillance module adapted to receive a surveillance message transmitted by an aircraft, said surveillance message containing information on the position of said aircraft,
a control module configured to estimate the geographical zone in which said terminal is located, as a function of the information on the position of the aircraft extracted from the received surveillance message, and to select a communication mode of the communication module as a function of the estimated geographical zone of said terminal.

In specific implementation modes, the surveillance module is adapted to receive ADS-B messages.

In specific implementation modes, the surveillance module is adapted to receive 1090ES messages.

In specific implementation modes, the communication module is configured to transmit Ultra Narrow Band signals.

BRIEF DESCRIPTION OF THE DRAWINGS

The invention will be better understood upon reading the following description, provided as an example and not limited thereto, and with reference to the figures, which represent.

In these figures, references that are identical from one figure to the other describe identical or similar elements. For the sake of clarity, represented elements are not to scale, unless otherwise specified.

DETAILED DESCRIPTION OF THE EMBODIMENTS

Figure 1:
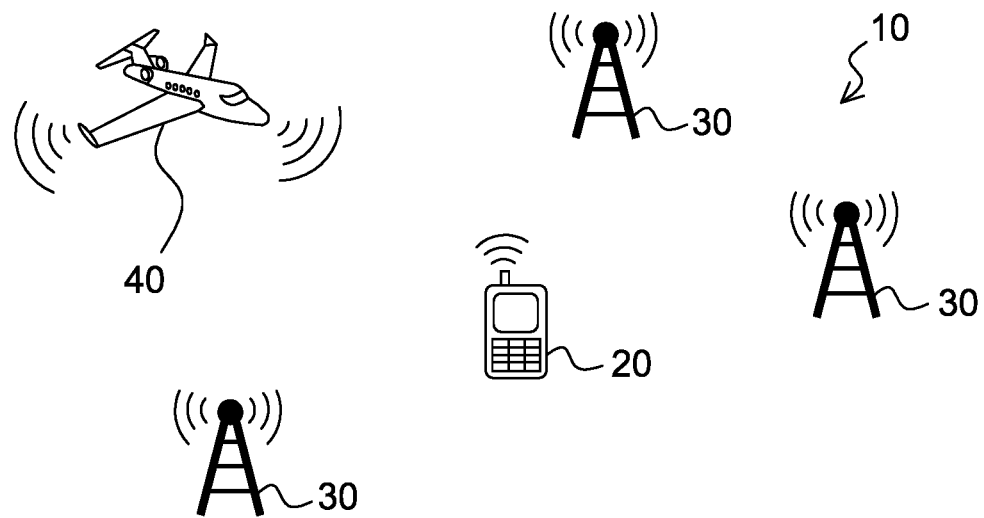
FIG. 1: a schematic representation of a wireless communication system.

FIG. 1 provides a schematic representation of a wireless communication system 10 that includes a terminal 20 and several base stations 30 distributed over a given geographical zone.

The terminal 20 and the base stations 30 exchange data in the form of radioelectric signals. The term "radioelectric signal" is used to describe an electromagnetic wave travelling wirelessly, with frequencies included in the traditional spectrum of radioelectric waves (a few hertz to several hundred gigahertz).

In this description, we consider the non-limiting case in which the exchange of data between the terminal 20 and the base stations 30 is bidirectional. In other words, the terminal 20 is adapted to transmit data on an uplink to the base stations 30, and to receive data on a downlink from said base stations 30 to said terminal 20.

However, there is nothing to exclude, in other examples, transmissions conducted solely on the uplink or solely on the downlink. In particular, many IoT-type applications relate to the collection of data transmitted by terminals 20 and are perfectly suited to unidirectional exchanges, occurring only on the uplink of each terminal 20 and the base stations 30.

In this description, we consider the non-limiting case in which the wireless communication system 10 is of the Ultra Narrow Band type. The term "Ultra Narrow Band", or UNB, is used to describe the fact that the instantaneous frequency spectrum of radioelectric signals transmitted by the terminals 20 has a frequency bandwidth that is inferior to two kilohertz, and even to one kilohertz. These provisions are particularly advantageous because the emission of such radioelectric signals is achieved with reduced power consumption, which is particularly well suited to IoT-type applications.

Figure 2:
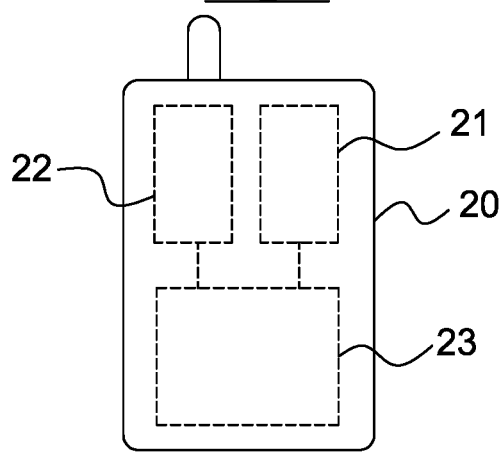
FIG. 2: a schematic representation of an example of a terminal implementation.

FIG. 2 provides a schematic representation of an implementation example of a terminal 20.

As shown in FIG. 2, the terminal 20 includes a communication module 21 that is adapted to exchange data with the base stations 30 of the wireless communication system 10.

More specifically, the communication module 21 can use at least two different communication modes. The two different communication modes that can be used by the communication module 21 differ, for example, by at least one of the following parameters:
- frequency band of the signals transmitted by the terminal 20,
- frequency band of the signals received by the terminal 20,
- power of the signals transmitted by the terminal 20,
- data throughput of the signals transmitted by the terminal 20,
- access method to the uplink or downlink, etc.

The different communication modes that can be used by the communication module 21 are used in different respective geographical zones, and their purpose is to comply with local regulatory requirements. For example, the different geographical zones are as follows:
- the geographical zone that includes the countries of Europe, the Middle East and Africa (EMEA),
- the United States of America (USA),
- the geographical zone that includes the countries of Latin America (LATAM), etc.

Therefore, when the terminal 20 is located in a first geographical zone (for example EMEA), the communication module 21 of said terminal 20 uses a first communication mode to exchange data with the base stations 30 distributed within this first geographical zone. When the terminal 20 is located in a second geographical zone (for example USA), the communication module 21 uses a second communication mode to exchange data with the base stations 30 distributed within this second geographical zone, etc.

It is therefore clear that the terminal 20 must be able to adapt the communication mode used by the communication module 21 to exchange data with the base stations 30 of the geographical zone in which it is located, in particular if the terminal 20 can be moved from one geographical zone to another, and/or for the initial commissioning of said terminal 20 in a geographical zone that is not known a priori, etc.

As shown in FIG. 2, for this purpose the terminal 20 includes:
- a surveillance module 22 adapted to receive surveillance messages transmitted by aircrafts 40, each surveillance message containing information on the position of the aircraft 40 that transmitted it,
- a control module 23 configured to select the communication mode to be used as a function of the information on the positions of aircrafts 40 extracted from received surveillance messages.

The control module 23 includes, for instance, one or several processors and storage means (magnetic hard drive, electronic memory, optical disc, etc.) in which a computer program product is stored, as a set of program code instructions to execute for the implementation of the steps involved in the selection of the communication mode of the communication module 21, as a function of the information on the positions of aircrafts in the vicinity of terminal 20, extracted from the received surveillance messages. In another embodiment, the control module 23 includes one or several programmable logic devices (FPGA, PLD, etc.) and/or one or several application-specific integrated circuits (ASIC), etc. adapted to implement all said steps, or part thereof.

In other words, the control module 23 includes a set of means that are configured by software (specific computer program product) and/or by hardware (FPGA, PLD, ASIC, etc.) to implement the steps for the selection of the communication mode of the communication module 21, as a function of the information on the positions of aircrafts extracted from the received surveillance messages.

The surveillance module 22 is, for example, adapted to receive ADS-B messages. In this description, we consider the non-limiting case in which the surveillance module 22 is adapted to receive ADS-B messages of the 1090ES-type (Mode S Extended Squitter).

Figure 3:
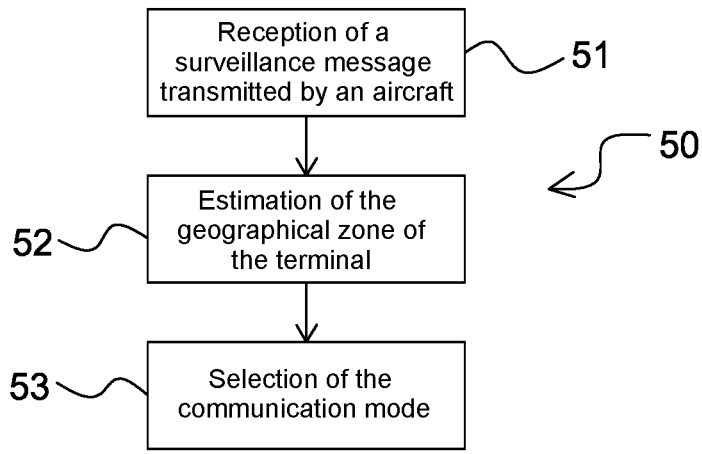
FIG. 3: a diagram showing the main steps of the selection method of a communication mode.

FIG. 3 provides a schematic representation of the main steps of a method 50 of selecting a communication mode implemented by the terminal 20, which are:
- reception 51, by the surveillance module 22, of a 1090ES message transmitted by an aircraft 40, whereby said 1090ES message contains information on the position of said aircraft that transmitted it,
- estimation 52, by the control module 23, of the geographical zone where said terminal 20 is located, as a function of the information on the position of the aircraft 40 extracted from said 1090ES message received from the aircraft,
- selection 53, as a function of the estimated geographical zone of said terminal 20, of the communication mode to be used to exchange data with the base stations 30 in the vicinity.

Therefore, during the reception step 51, the surveillance module 22 receives a 1090ES message and extracts the information included in the 1090ES message relating to the position of the aircraft 40 that transmitted it. The information on the position can be, for example, the GPS (Global Positioning System) coordinates of the aircraft 40. During the reception step 51, a single 1090ES message can be received, or several 1090ES messages can be received, potentially transmitted by various aircrafts 40.

During the step 52 of estimating the geographical zone of the terminal 20, the control module 23 estimates the geographical zone in which the terminal 20 is located.

In a particularly simple example of implementation, when a single 1090ES message is received by the surveillance module 22, the control module 23 estimates the position of the terminal 20 as being equal to the position information extracted from the received 1090ES message.

As mentioned previously, this estimation of the position of the terminal 20, as a function of a single 1090ES message, is not very accurate as the range of a 1090ES message is of approximately 300 kilometers. However, this accuracy is generally sufficient to differentiate various geographical zones, as these are usually at a great distance from one another (for example the USA and the EMEA).

To improve the accuracy of the estimated position of the terminal 20, several 1090ES messages can be taken into account, preferably transmitted by several aircrafts 40.

According to a first example, when the surveillance module 22 of the terminal 20 receives 1090ES messages transmitted by several aircrafts 40, the step 52 of estimating the geographical zone of the terminal 20 includes selecting one 1090ES message among said received 1090ES messages. For example, the selected 1090ES message is the one received with the highest power, and the position of the terminal 20 is estimated as being equal to the position information extracted from the selected 1090ES message. Indeed, the 1090ES message received with the highest power is generally transmitted by the aircraft 40 that is the closest to the terminal 20, such that the distance between the aircraft 40 and said terminal 20 is generally much shorter than the maximum range (300 kilometers) of 1090ES messages.

In another example, when the surveillance module 22 of the terminal 20 receives 1090ES messages transmitted by several aircrafts 40, the geographical zone in which the terminal 20 is located includes estimating the position of said terminal as a function of the information on the positions of aircrafts 40 extracted from several received 1090ES messages. For example, considering a range of 300 kilometers for the 1090ES messages, the zone covered by an aircraft 40 is roughly a circle with a radius of 300 kilometers, centered on the position of the aircraft 40. The terminal 20, receiving 1090ES messages from several aircrafts 40, is therefore at the intersection of the coverage zones of these aircrafts 40. The estimated position of said terminal 20 can be any position within the intersection of said coverage zones of said aircrafts or, preferably, the geometric center of the positions of the aircrafts 40, for example weighted respectively by the reception power of the 1090ES messages received from these aircrafts.

Then, the geographical zone in which the terminal 20 is located can be estimated as a function of the estimated position of said terminal 20.

For example, the terminal 20 can store in a non-volatile memory, in any adapted form, a map delineating the different geographical zones that can be used, based on the estimated position of the terminal 20, to determine the geographical zone in which said terminal 20 is located.

To reduce the quantity of information stored in the non-volatile memory of said terminal 20, only one or a few reference positions can be stored for each geographical zone. To estimate the geographical zone in which the terminal 20 is located, the estimated position of said terminal 20 is compared with each reference position, and the estimated geographical zone is the geographical zone in which is located the reference position that is closest to the estimated position of said terminal 20.

Once the geographical zone in which the terminal 20 is located has been estimated, the step 53 of selecting the communication mode resumes to choosing the communication mode associated with the estimated geographical zone. For this purpose, the terminal 20 includes, for example, a non-volatile memory in which is stored a table that comprises, for each possible geographical zone, the associated communication mode.

Table 1 below gives a non-limiting example of a table that can be stored in the non-volatile memory of the terminal 20. In this example, the geographical zones EMEA, USA and LATAM are considered, and there is a single reference position for each one of these geographical zones.

TABLE 1

Examples of geographical zones

| Geographical zone | Reference position | Communication mode |
|---|---|---|
| EMEA | Paris (48.86; 2.35) | MC1 |
| USA | New York (40.71; −74.01) | MC2 |
| LATAM | São Paulo (−23.55; −46.64) | MC3 |

For example, a terminal 20 located in Barcelona can receive a 1090ES message from an aircraft 40 located in the vicinity of Toulouse. In this case, the estimated position of said terminal 20, as a function of this single 1090ES message, is considered to be equal to the position of aircraft 40, which is roughly the position of Toulouse. The comparison of the estimated position of the terminal 20 with the reference positions provides approximately the following results:

distance between the terminal 20 and Paris: 830 kilometers,
distance between the terminal 20 and New York: 6162 kilometers,
distance between the terminal 20 and São Paulo: 8740 kilometers.

Therefore, the terminal 20 determines that the closest reference position is the one associated with the EMEA geographical zone. The estimated geographical zone is the EMEA geographical zone, and the selected communication mode is therefore the MC1 communication mode.

Table 2 below provides examples of MC1, MC2 and MC3 communication modes, respectively associated with the geographical zones EMEA, USA and LATAM. In this example, the communication modes may differ from one communication mode to another, by:
the power of the signals transmitted by the terminal 20 ("TX power" in the following table),
the frequency band of the signals transmitted by the terminal 20 ("TX band" in the following table),
the frequency band of the signals received by the terminal 20 ("RX band" in the following table),
the data throughput of the signals transmitted by the terminal 20 ("Throughput" in the following table),
the access method to the uplink, in this case the obligation to listen to the uplink before transmitting ("Listen Before Talk" or LBT in the following table), or lack thereof.

TABLE 2

Examples of communication modes

| Communication mode | TX power (dBm) | TX band (MHz) | RX band (MHz) | Throughput (bps) | LBT |
|---|---|---|---|---|---|
| MC1 | 14 | 868.13 | 869.525 | 100 | No |
| MC1 | 22 | 902.8 | 905.8 | 600 | No |
| MC3 | 30 | 915.5 | 916.2 | 600 | Yes |

More broadly, it should be noted that the implementation modes and embodiments considered above are provided as examples and are not limited thereto, and that other versions can be envisaged.

In particular, the invention is described with consideration for 1090ES-type surveillance messages primarily. According to other examples, there is nothing to exclude a surveillance module 22 adapted to receive, additionally or alternately, other types of ADS-B messages, for example UAT (Universal Access Transponder at 978 MHz) and/or VDL mode 4 (VHF Data Link mode 4). It should also be noted that, more broadly, the invention is applicable to any type of surveillance message transmitted by an aircraft, as long as it contains information on the position of said aircraft that transmitted it. Furthermore, the invention is applicable to any type of aircraft (plane, hot air balloon, drone, helicopter, etc.) that is able to transmit surveillance messages.

Furthermore, the invention has been described with consideration only for the communication modes used by a terminal 20 to transmit signals on an uplink, from the terminal 20 to the base stations 30. The invention can also be used, additionally or alternately, on a downlink from a base station 30 to terminals 20. In other words, the invention is more broadly applicable to the selection, by a transmitting device, of a communication mode to be used to exchange data with a receiving device of the wireless communication system 10, wherein said transmitting device can be a terminal, a base station, an access point, a remote control or any other type of wireless communication device that relies on different communication modes associated with different respective geographical zones.

Furthermore, the invention has been described by considering that the wireless communication system 10 is an Ultra Narrow Band system. There is, however, nothing to exclude the consideration of other types of wireless communication systems. It is also possible, for said terminal 20, to use communication modes that differ in the bandwidth of the instantaneous frequency spectrum of transmitted radioelectric signals. In this case, it is possible that only some of the communication modes supported by the terminal 20 are Ultra Narrow Band.

The invention claimed is:

1. A method of selecting, by a terminal of a wireless communication system, a communication mode to be used in exchanging data with base stations of said wireless communication system, comprising steps of:
    receiving, by the terminal, a surveillance message transmitted by an aircraft, the surveillance message comprising a position information of the aircraft, the terminal being separate from the aircraft and unknown to the aircraft;
    estimating, by the terminal, a geographical zone where the terminal is located, as a function of the position information of the aircraft extracted from the surveillance message; and
    selecting the communication mode, by the terminal, among at least two different communication modes associated with different respective geographical zones, as a function of the estimated geographical zone of the terminal, for exchanging data with the base stations.

2. The method according to claim 1, wherein said at least two different communication modes differ by at least one of the following parameters:
    a frequency band of the signals transmitted by the terminal;
    a frequency band of the signals received by the terminal;
    a power of the signals transmitted by the terminal;
    a data throughput of the signals transmitted by the terminal; and
    a method of access to a channel on which data is exchanged between the terminal and base stations.

3. The method according to claim 1, wherein the surveillance message received from the aircraft is an ADS-B message as a surveillance message.

4. The method according to claim 3, wherein the surveillance message received by the terminal from the aircraft is a 1090ES message.

5. The method according to claim 1, wherein when the terminal receives surveillance messages transmitted by several aircrafts, the step of estimating the geographical zone of the terminal includes selecting a surveillance message among said received surveillance messages, and the geographical zone of said terminal is estimated as a function of the information on the position of the aircraft extracted from said selected surveillance message.

6. The method according to claim 1, wherein the step of estimating the geographical zone of the terminal, in response to reception of surveillance messages transmitted by a plurality of aircrafts, comprises steps of estimating a position of the terminal as a function of the position information of said plurality of aircrafts extracted from the surveillance messages received from said plurality of aircrafts; and estimating the geographical zone of the terminal as a function of the estimated position of the terminal.

7. The method according to claim 1, wherein the step of estimating the geographical zone of the terminal comprises a step of comparing an estimated position of the terminal with reference positions associated respectively with different geographical zones.

8. A terminal of a wireless communication system, comprising:
    a communicator configured to exchange data with base stations of said wireless communication system according to at least two different communication modes associated with different respective geographical zones;
    a receiver configured to receive a surveillance message transmitted by an aircraft, the surveillance message comprising a position information of the aircraft, the terminal being separate from the aircraft and unknown to the aircraft;
    a controller configured to estimate the geographical zone in which the terminal is located as a function of the position information of the aircraft extracted from the surveillance message and configured to select a communication mode of the communicator as a function of the estimated geographical zone of the terminal; and
    wherein the communicator exchanges data with the base stations of said wireless communication system using the communication mode selected by the controller.

9. The terminal according to claim 8, wherein the receiver is configured to receive ADS-B messages.

10. The terminal according to claim 9, wherein the receiver is configured to receive 1090ES messages.

11. Terminal according to claim 8, wherein the communicator is configured to transmit Ultra Narrow Band signals.

* * * * *